Dec. 2, 1924.                                                1,518,113
L. M. SARTAIN
RAIL COUPLER
Filed June 19, 1924
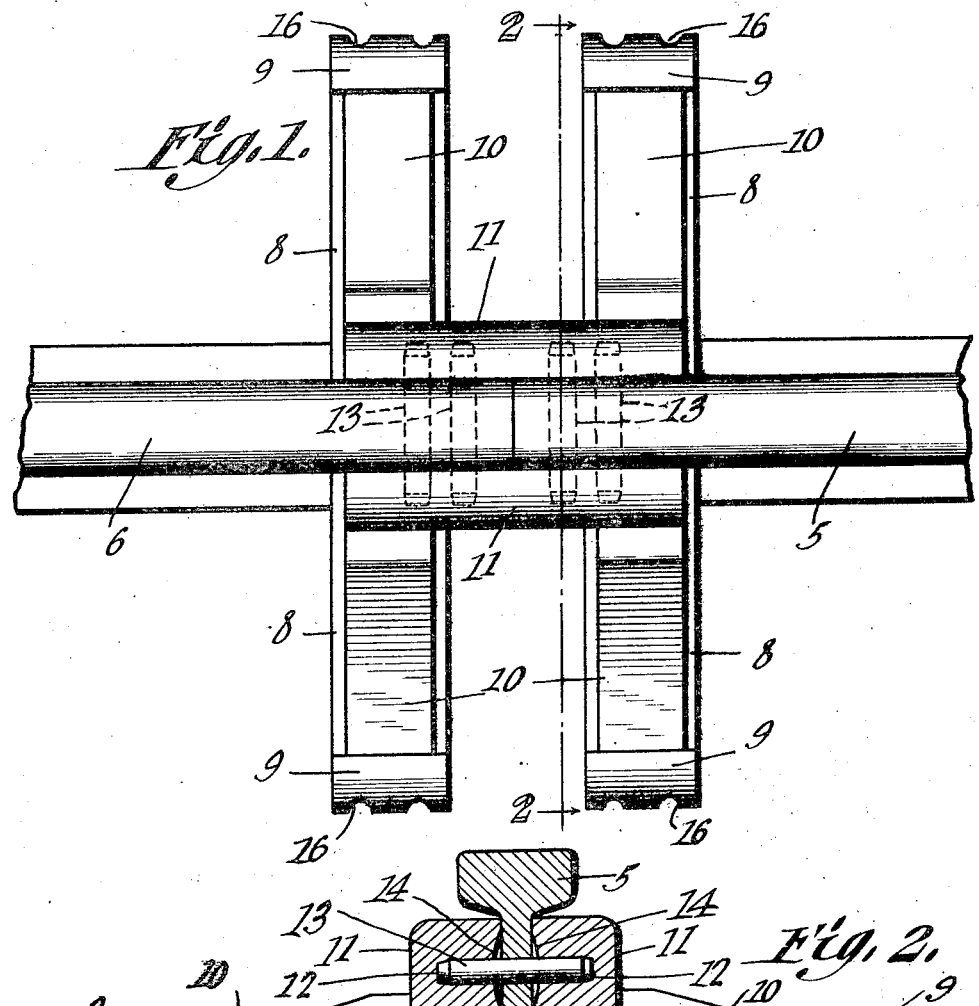
Fig. 1.
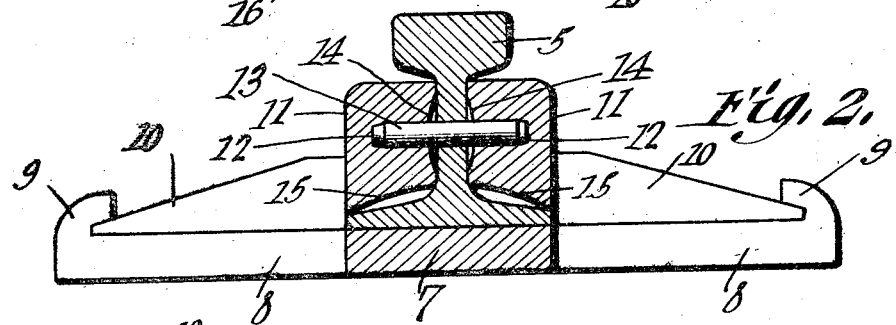
Fig. 2.
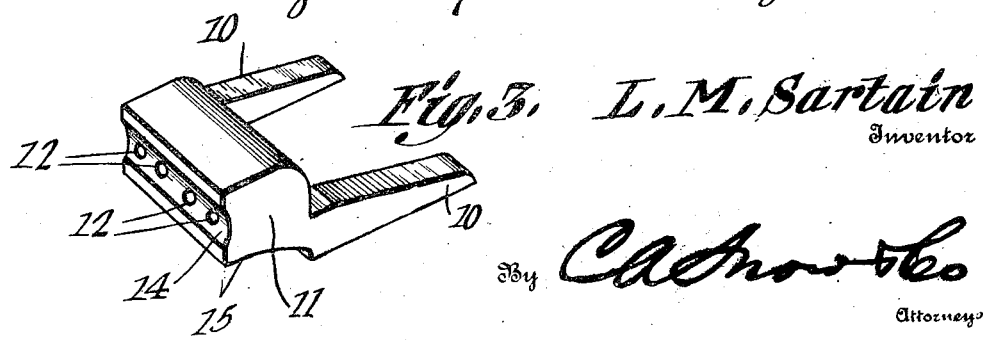
Fig. 3.  L. M. Sartain
Inventor
By
Attorneys Patented Dec. 2, 1924.

1,518,113

UNITED STATES PATENT OFFICE.

LOUIS MARTAIN SARTAIN, OF PELHAM, TENNESSEE, ASSIGNOR OF ONE-TENTH TO JOHN W. MARLER, OF ALTAMONT, TENNESSEE; ONE-TENTH TO WILLIAM H. WOODLEE, ONE-TENTH TO WILLIAM G. WOODLEE, ONE-TENTH TO LORENZY D. OAKES, AND ONE-TENTH TO HARVEY HAMBY, OF PELHAM, TENNESSEE; ONE-TENTH TO WILLIAM J. HINES, OF DECHERD, TENNESSEE; ONE-TENTH TO DOCK CHRISTIAN, OF MORRISON, TENNESSEE; AND ONE-TENTH TO WILLIAM P. STONE, OF TRACY CITY, TENNESSEE.

RAIL COUPLER.

Application filed June 19, 1924. Serial No. 721,051.

*To all whom it may concern:*

Be it known that I, LOUIS M. SARTAIN, a citizen of the United States, residing at Pelham, in the county of Grundy and State of Tennessee, have invented a new and useful Rail Coupler, of which the following is a specification.

This invention relates to railway rail joints and more particularly the construction of the fish plates and base plates supporting the fish plates, the primary object of the invention being to provide novel means for securing the adjacent ends of rails, eliminating the use of the usual bolts and nuts.

Another important object of the invention is to provide a rail joint which will prevent the rails from spreading and eliminate what is commonly known as low joints.

A still further object of the invention is to provide a one-piece tie plate of a construction to insure a rigid connection between the adjacent ends of rail sections, due consideration being given to the expansion and contraction of the sections.

With the foregoing and other objects in view which will appear as the description proceeds, the invention resides in the combination and arrangement of parts and in the details of construction hereinafter described and claimed, it being understood that changes in the precise embodiment of the invention herein disclosed, may be made within the scope of what is claimed, without departing from the spirit of the invention.

Referring to the drawing:

Figure 1 is a plan view disclosing the adjacent ends of rail sections as supplied with fish plates constructed in accordance with the invention.

Figure 2 is a sectional view taken on line 2—2 of Figure 1.

Figure 3 is a perspective view of one of the fish plates.

Referring to the drawing in detail, the reference character 5 indicates a rail and the reference character 6 indicates the adjacent rail section, which sections are connected by the fish plates and tie plate constructed in accordance with the invention.

The tie plate forming a part of the invention includes a body portion 7 which is of a width equal to the base of the rail sections positioned thereon. Extending laterally from the base 7 and arranged in spaced relation with each other are arms 8 which are provided with upwardly extended portions 9 that embrace portions of the arms 10 of the fish plates 11 to hold the outer ends of the arms 10 into close engagement with the arms 8 of the tie plate.

As clearly shown by Figure 3 of the drawing, the fish plates 11 are formed with pairs of openings 12 that accommodate the pins 13 that extend transversely through suitable openings formed in the adjacent rail sections for uniting the fish plates and rail sections to insure against vertical movement of the fish plates with respect to the base plate, and at the same time limit movement of the fish plates longitudinally of the rail sections.

The fish plates are provided with cut out portions 14 and 15 which when the fish plates are brought into engagement with the rail provides spaces between the fish plates and rail.

The outer extremities of the arms 8 are formed with cut out portions 16 to accommodate the usual securing spikes for securing the base plate to the tie disposed thereunder.

To assemble the structure, it is only necessary to position the pins 13 in the rail sections and move the fish plates into engagement with the rail sections, the openings in the fish plates accommodating the pins 13. The base plate may now be moved to a position under the fish plates whereupon the fish plates will be held against movement with respect to the rail, and it will be necessary to move the base plate longitudinally of the rail sections in order to release the fish plates.

It might be further stated that due to this construction, the adjacent ends of the rail sections will be held in the same horizontal plane eliminating what is commonly known as a low joint.

I claim:—

In combination with the adjacent ends of rail sections, a base plate including a base of a width equal to the width of a rail base, laterally extended arms formed integral with the base plate and having hook portions at their ends, fish plates having arms, the outer ends of the arms being disposed under the hook portions, and pins extending through the adjacent ends of the rail sections and extending into the the fish plates for securing the fish plates against movement longitudinally of the rail sections.

In testimony that I claim the foregoing as my own, I have hereto affixed my signature in the presence of two witnesses.

LOUIS MARTAIN SARTAIN.

Witnesses:
N. G. JONES,
Mrs. J. N. MARLER.